Aug. 9, 1960 M. L. REEVES 2,948,868

FREQUENCY SENSITIVE ELECTROMAGNETIC WAVE DEVICE

Filed Nov. 14, 1955 3 Sheets-Sheet 1

INVENTOR
M. L. REEVES
BY Roy M. Porter, Jr.
ATTORNEY

Aug. 9, 1960 M. L. REEVES 2,948,868

FREQUENCY SENSITIVE ELECTROMAGNETIC WAVE DEVICE

Filed Nov. 14, 1955 3 Sheets-Sheet 2

INVENTOR
M. L. REEVES
BY Roy M. Porter Jr.
ATTORNEY

FREQUENCY SENSITIVE ELECTROMAGNETIC WAVE DEVICE

Filed Nov. 14, 1955 3 Sheets-Sheet 3

INVENTOR
M. L. REEVES
BY Roy M. Porter, Jr.
ATTORNEY 2,948,868
Patented Aug. 9, 1960

1

2,948,868

FREQUENCY SENSITIVE ELECTROMAGNETIC WAVE DEVICE

Marvin L. Reeves, Seattle, Wash., assignor to Bell Telephone Laboratories, Incorporated, New York, N.Y., a corporation of New York Filed Nov. 14, 1955, Ser. No. 546,392
1 Claim. (Cl. 333—73)

This invention relates to electromagnetic wave transmission systems and, more particularly, to frequency sensitive attenuating means having predetermined and controllable bands of attenuation with respect to the frequency of components of said energy.

It has heretofore been proposed to place an element of gyromagnetic material in the path of and in the field pattern of electromagnetic wave energy and to bias this material to a point at which it becomes resonant in a gyromagnetic sense to the frequency of the applied wave energy. Under this condition certain gyrating electrons within the material couple strongly with clockwise rotating components of the high frequency magnetic field and introduce substantial loss of attenuation to the wave energy. For all field strengths other than that required for resonance, the attenuation will be small. Heretofore the attenuation versus frequency characteristics of such devices have been limited to those of the resonance characteristics inherent in the particular materials used, which in the usual cases have been ferromagnetic materials having relatively broad resonance characteristics. No control existed and no adjustment was possible of the band of these characteristics.

It is an object of the present invention to control the band and frequency selectivity of gyromagnetic attenuating devices.

It is a further object of the invention to filter electromagnetic wave energy by gyromagnetic means in acordance with a predetermined high pass, low pass or band pass characteristic.

In accordance with the present invention, it has been recognized that materials of the type classified as paramagnetic, and, more particularly, as organic free radicals, have very sharp gyromagnetic resonance characteristics. Different finite portions of such an element are subjected to biasing magnetic fields of different intensities. Since the frequency of resonance is directly proportional to the strength of the biasing magnetic field, each finite portion produces resonance at, and therefore introduces attenuation to, wave energy of slightly different frequency. By tapering the magnetic field through all values producing resonance at the frequencies within a given band, the entire band is eliminated. If the highest frequency attenuated is at least as high as the highest frequency of interest, a filter having a low pass characteristic is obtained for which the cutoff frequency is just below the lowest frequency attenuated. Furthermore, in accordance with specific embodiments of the invention, the lowest frequency attenuated is extended down to zero to produce a filter having high pass characteristics. By means of a novel combination of a low pass filter structure and a high pass filter structure, a band pass filter is realized In all embodiments both the bandwidth and the cutof frequencies are readily designed to predetermined specifi cations and, if desired, may be made adjustable in th manner to be described.

These and other objects, the nature of the present in vention, its various features and advantages, will appea more fully upon consideration of the specific illustrativ embodiments shown in the accompanying drawings an described in detail in the following explanation of thes drawings.

Figures 1, 2:
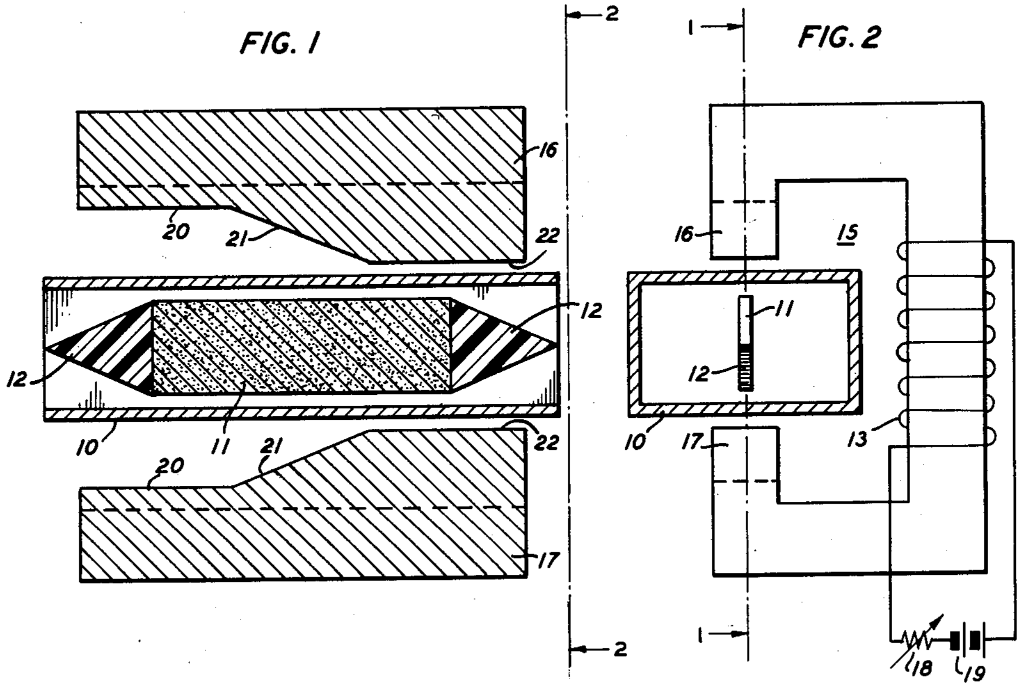
Fig. 1 is a longitudinal cross-sectional view of a pre ferred embodiment having low pass filter characteristic in accordance with the invention.
Fig. 2 is a transverse cross-sectional view of Fig. 1 taken as indicated.
Figure 3:
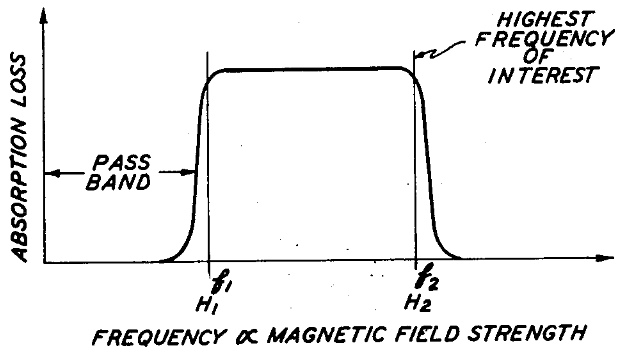
Figure 4:
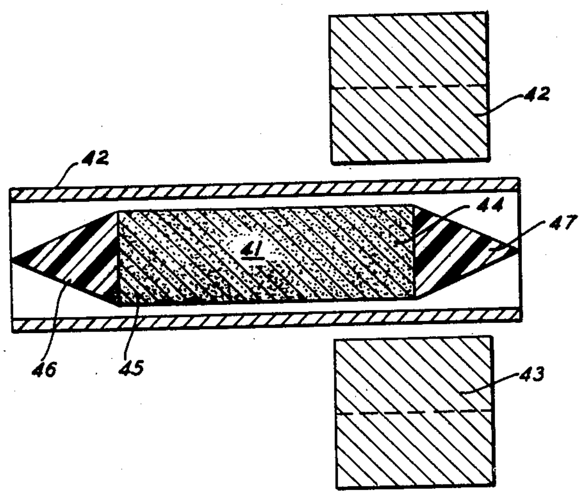
Figure 5:
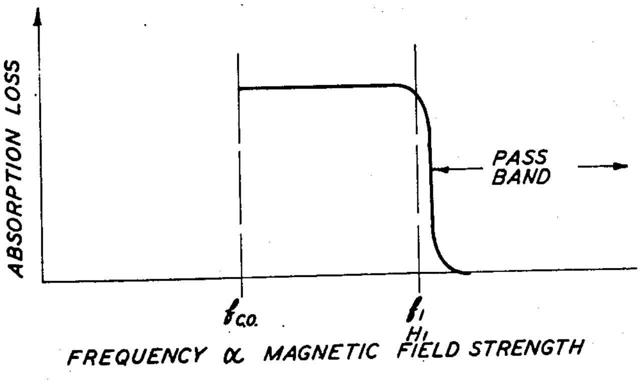
Figure 6:
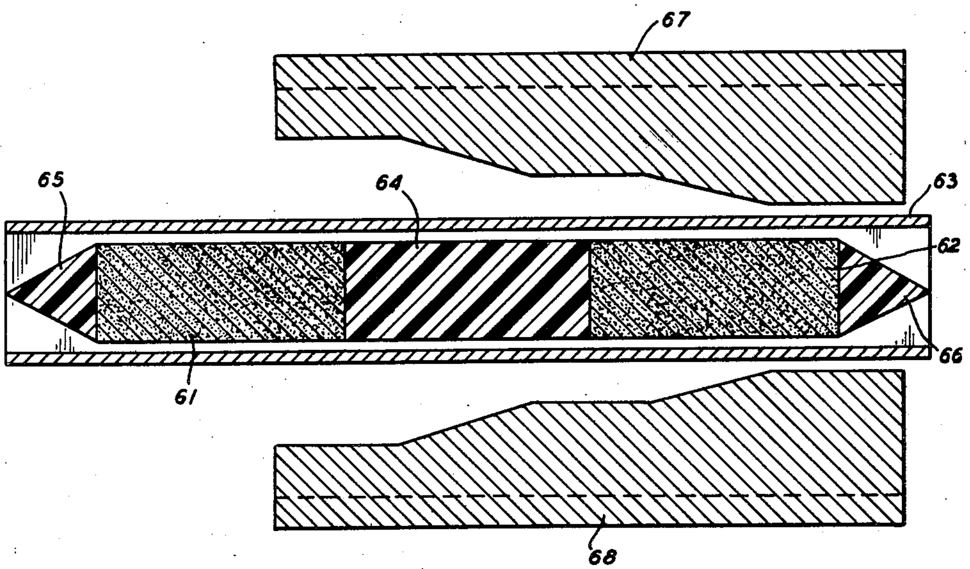
Figure 7:
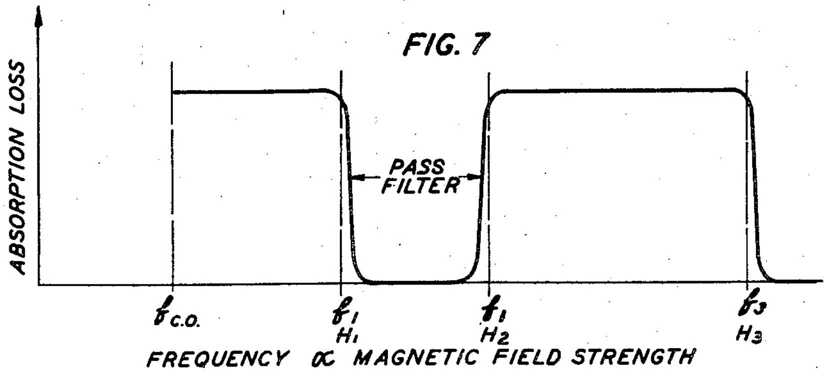
Figure 8:
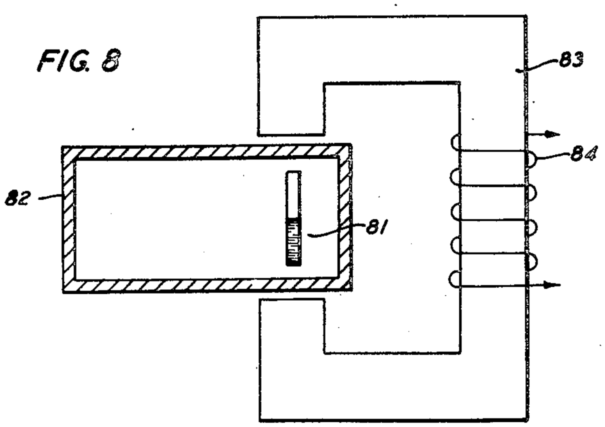

Fig. 3, given by way of explanation, is a characteristi of the absorption loss versus frequency or magnetic fiel strength of the embodiment of Fig. 1;

Fig. 4 is a longitudinal cross-sectional view of an em bodiment of the invention having high pass filter char acteristics;

Fig. 5, given by way of explanation, is a characteristi of the absorption loss versus frequency or magnetic fiel strength of the embodiment of Fig. 4;

Fig. 6 is a longitudinal cross-sectional view of an em bodiment of the invention having band pass filter char acteristics;

Fig. 7 is a longitudinal cross-sectional view of a embodiment of the invention having band pass filter char acteristics; and Fig. 8 is an alternative end view for the embodiment of Figs. 1, 4 or 6, by means of which nonreciprocal filte characteristics are realized.

Referring more particularly to Fig. 1 and the trans verse view thereof of Fig. 2, an illustrative embodimen of the invention having low pass filter characteristics com prises a section 10 of conductive rectangular wave guid which is to be interposed in the path of linearly polarize wave energy to be filtered. Located in guide 10 an substantially centered therein is an elongated vane 1 of gyromagnetic material of the type to be described hav ing a width of a small fraction of a wavelength. Van 11 is positioned in guide 10 to extend in a plane parall to a narrow wall thereof for slightly less than the distanc between the wider walls and to extend longitudinally i guide 10 parallel to the narrow walls for several wav lengths. The longitudinal ends of vane 11 are continuou into tapered members 12 of dielectric material to pr vent undue reflections from these ends.

Vane 11 is composed of a gyromagnetic material, i.e a material of the type that exhibits gyromagnetic res nance to electromagnetic wave energy in the frequenc range to be filtered and which has a resonance ban width that is small compared to the bandwidth of the d sired filter characteristic. In accordance with the broa est aspects of the invention, this includes the noncondu tive ferromagnetic materials, such as ferrite, and als the nonconductive paramagnetic organic free radical con pounds. The phenomenon of gyromagnetic resonanc in ferromagnetic materials is well known to the art. E sentially the same principles are involved with the par magnetic materials and may be explained by the reco nition that these materials contain unpaired electron spi which tend to line up with an externally applied magnetic field. These spins have an associated magnetic moment which may be made to precess about the line of the biasing magnetic field at a resonant frequency dependent upon the intensity of the field. When a field of high frequency wave energy is also applied to the material, any clockwise rotating circularly polarized components of the wave tend to couple strongly with the gyrating electrons when the frequency of the high frequency energy is equal to the resonant frequency of the electrons. This introduces substantial loss or attenuation to the wave. Therefore the frequency of attenuation or the frequency of the high frequency wave that will be resonant with the electrons is directly proportional to the strength of the biasing field and may be varied over a considerable range. For field strengths other than that required for resonance the attenuation will be small.

In accordance with the invention, it has been found that different portions of the same element may be subjected to biasing fields of different intensity and that each portion will produce resonance at, and introduce attenuation to, wave energy of different frequencies. A desired filter characteristic is therefore built up from the resonance absorption of each portion by applying a magnetic field of properly differing intensity to each of the portions to absorb selected frequency components from the total bandwidth of the applied wave energy. This effect can only be taken advantage of if the total bandwidth of the applied energy is substantially greater than the resonance bandwidth of any one portion. Since the ferromagnetic materials have resonance bandwidths that are relatively large compared to the wave energy bandwidths now considered for commercial applications, the use of ferromagnetic materials will only be practical with substantially wider bands than are presently contemplated. On the other hand, the materials classified as paramagnetic and, more particularly, the paramagnetic materials known as organic free radicals because they have an odd number of electrons, have very narrow resonance bandwidths in the order of several oersteds. This compares with the bandwidth of a typical ferrite compound of several hundred oersteds. The fact of the narrow bandwidth means that these materials exhibit a resonance characteristic like that of a very high Q circuit. For example, in a typical organic free radical compound, a Q of from one to ten thousand in a range of interest including the frequency range of ten to fifty-five kilomegacycles is exhibited, the Q being highest at the higher frequencies.

The following table lists several of the more common organic free radical compounds together with their resonance bandwidths at the half-power points. This listing is by no means to be considered as exclusive of other compounds of this class which may likewise be used to practice the invention.

| Compound | Bandwidth at half-power points, oersted |
|---|---|
| anfield and Kenyon's radical | 18.4 |
| i-para-anisyl nitric oxide | 31.4 |
| iphenyl trinitrophenyl hydrazyl | 2.70 |
| orphyrexide | 17.0 |
| orphyrindine | 25.2 |
| henanthro-phenazinium chlorstannite | 6.4 |
| 'urster's Blue (as ferricyanide) | 3.7 |
| 'urster's Blue (as picrate) | 6.0 |

Wurster's Blue is a class of dyes derived from the ionization of the compound N,N,N',N'-tetramethyl-p-phenylenediamine, ($C_{10}H_{16}N_2$) known as Wurster's reagent. When placed in solution with an oxidant, such as picric acid or a ferricyanide, the organic free radical compound Wurster's Blue (as picrate) or Wurster's Blue (as ferricyanide) is formed. (See, The Journal of the American Chemical Society, vol. 53, July–September 1931, pages 2953–2955, and The Concise Chemical and Technical Dictionary by H. Bennett, page 989.) Banfield and Kenyon's radical is the complex compound [$\beta$-(phenyl nitric oxide)-$\beta$-methyl pentane-$\delta$-one oxime N-phenyl ether]. (See Philosophical Magazine, vol. 44, 1953, page 1187.

Thus, in accordance with a preferred embodiment of the invention, vane 11 is composed of Wurster's Blue (as ferricyanide), being a compound from the preceding table that has one of the narrowest bandwidths and that is also readily available. Vane 11 is then biased by a magnetic field parallel to the plane of vane 11 and perpendicular to the direction of propagation along guide 10, the intensity of which commences at one end of vane 11 with a first value and then increases gradually along vane 11 to a larger value. This field may be supplied as illustrated by a solenoid structure 15 comprising a C-shaped magnetic core which has pole-pieces 16 and 17 spaced apart to form an air gap in which the magnetic field is concentrated and between which guide 10 and vane 11 are received. Turns of wire 13 on core 16—17 are so wound and connected through rheostat 18 to a source potential 19 that north and south poles are produced for pole-pieces 16 and 17, respectively.

The intensity of the field that biases a given portion of vane 11 is determined by the length of the air gap between the portions of the pole-pieces 16 and 17 receiving that part of the vane. Thus the faces of pole-pieces 16 and 17 are tapered over three portions 20, 21 and 22. In portion 20 the air gap is of such distance that a field intensity $H_1$ is produced in the left hand end of vane 11. $H_1$ corresponds to the intensity that produces resonance at a frequency $f_1$ just above the highest frequency to be passed as illustrated in Fig. 3 by the characteristic of absorption loss versus frequency and magnetic field strength, the latter two parameters being proportional to each other. Portion 20 preferably extends for some distance on either side beyond the exact end of vane 11 so that the fringe effects of the field do not decrease its intensity in vane 11 below the desired strength $H_1$. Thus the band of frequencies below the frequency $f_1$, representing the cutoff of the filter, will be propagated through guide 10 with substantially no attenuation due to the presence of vane 11. Portion 21 of pole-pieces 16 and 17 comprises a section of progressively decreasing air gap and therefore of progressively increasing biasing intensity. Thus successive portions of vane 11 are resonant to and therefore absorb progressively higher frequency components in the band above $f_1$. Portion 22 of pole-pieces 16 and 17 produces a field intensity $H_2$ in the right hand end of vane 11. The intensity $H_2$ produces resonance at the frequency $f_2$ which for low pass operation should be at least as high as the highest frequency to be attenuated.

Thus the embodiment of Fig. 1 provides a filter structure that passes all frequency components up to the frequency $f_1$ and attenuates all components of interest having frequencies between $f_1$ and $f_2$. By increasing or decreasing the magnetizing current by adjusting rheostat 18, the value of $f_1$ may be shifted along the frequency scale thus providing a low pass filter of variable cutoff frequency. If adjustment is not desired it is apparent that the field may be supplied by a suitably shaped permanent magnet structure. It should also be apparent that if the frequency $f_2$ falls within the band of interest, an equally useful band rejection filter is provided. If band rejection use is contemplated, a solenoid may be provided which allows independent adjustment of the intensity $H_2$ so that frequency $f_2$ may be shifted along the frequency scale independently of the frequency $f_1$. In any event, the sharpness of the cutoff at the frequency $f_1$ or $f_2$ is equivalent to the shape of the resonant characteristic of the material used. In the particular case of Wurster's Blue (as ferricyanide), it has been determined that a magnetic field in the order of 4,000 oersteds produces a cutoff frequency in the order of 11,300 megacycles with a very sharp cutoff that corresponds to a resonant line width in the order of 2 to 3 oersteds.

In Fig. 4 a gyromagnetic filter having a high pass characteristic is shown. A vane 41 which is substantially identical to vane 11 of Fig. 1 is located in a rectangular guide 42 in a similar position to vane 11 in guide 10. Dielectric tapers 46 and 47 are provided at the ends of vane 41. Pole-pieces 42 and 43 are provided to supply the biasing magnetic field to vane 41. These pole-pieces have a constant air gap that includes only the end 44 of vane 41 with the end 45 extending beyond the pole-pieces 42 and 43 into the region of progressively decreasing field intensity for a sufficient distance that the end 45 is subject to a magnetic field of zero. The resulting absorption loss characteristic is shown in Fig. 5. Each successive portion of vane 41 starting at end 45 is resonant to and attenuates components having frequencies commencing well below the cut-off frequency $f_{co}$ of the wave guide 10 and extending to successively higher frequencies as the biasing field strength of each portion becomes larger than that of the preceding portion. At end 44, vane 41 is subjected to the maximum biasing field $H_1$ which is of such strength to produce attenuation at the frequency $f_1$. Thus only wave energy having a frequency above $f_1$ is passed through guide 42. By adjusting the strength of the field $H_1$, the cutoff frequency $f_1$ may be controlled and varied to produce a high pass filter of adjustable pass band.

In the embodiment of Fig. 6 the features of the low pass filter of Fig. 1 and the high pass filter of Fig. 6 are combined to produce a structure having a band pass characteristic. Thus two gyromagnetic vanes 61 and 62 are placed in longitudinal succession in the rectangular guide 63. Vanes 61 and 62 are separated by a vane-like spacer 64 consisting of dielectric material. The separation provided by spacer 64 is sufficient that gyromagnetic vanes 61, 62 may be subjected to biasing fields of different intensities without interaction. The left end of vane 61 and the right end of vane 62 are provided with tapers 65 and 66 of dielectric material as in the preceding embodiments. Magnetic pole-pieces 67 and 68 are located above and below guide 63, respectively, to bias the right hand end of vane 61 and all of vane 62 by a tapered magnetic field. The left hand end of vane 61 extends beyond pole-pieces 67 and 68 at least into a region of zero intensity. As in the preceding embodiments, the air gap between the pole-pieces 67 and 68 controls the biasing intensity of each portion of vanes 61 and 62. The distribution of the field intensity and the resultant band pass characteristic are shown in Fig. 7. Thus, commencing with the left hand end of vane 61, the intensity of this field is zero and increases along vane 61 to an intensity $H_1$ at its right hand end, increases again in the region of dielectrcic spacer 64 to an intensity $H_2$ at the left hand end of vane 62, and then increases to an intensity $H_3$ at the right hand end of vane 62. Since the frequency of attenuation of each portion of the vane is proportional to the intensity of magnetization, all components having frequencies between the guide cutoff $f_{co}$ and a frequency $f_1$, representing the resonant frequency produced by the intensity $H_1$, are absorbed in vane 61. Between the frequency $f_1$ and the frequency $f_2$ no energy is dissipated since the field strengths between $H_1$ and $H_2$ are applied only to dielectric spacer 64. Components having frequencies between $f_2$ and $f_3$, the latter representing the highest frequency of interest, are dissipated in vane 62.

While a single magnetic pole structure is shown for both vanes 61 and 62, it should be apparent that if separate poles are provided the frequencies $f_1$ and $f_2$ may be separately selected and adjusted to control the width of the pass band as well as its position along the frequency scale. With a single set of poles as illustrated, the percentage width of the band is fixed and only its position along the frequency scale may be adjusted.

The preceding embodiments as disclosed thus far ai all reciprocal with respect to the direction of propag: tion along the guides and the same attenuation chara teristic is presented to wave energy traveling in both d rections. In Fig. 8 is shown a transverse cross-section: view which may represent an alternative cross-section: arrangement for any of the preceding embodiments b means of which they become nonreciprocal. Thus i Fig. 8 a vane 81 of the type hereinbefore described is l cated asymmetrically in the cross section of guide 82 an more particularly, at a point displaced approximately or quarter of the guide width away from the narrow wal As taught in the copending applications of W. H. Hewit Serial No. 362,191, filed June 17, 1953, and of S. I Miller, Serial No. 362,193, filed June 17, 1953, th places vane 81 at a position of circularly polarized con ponents of the high frequency magnetic field of energ traversing guide 82 that rotate clockwise for one directio of propagation along guide 82 and counterclockwise f the opposite direction of propagation. Since the gyra ing electrons in the material of vane 81 will couple stron ly with only clockwise rotating magnetic field component gyromagnetic resonance will take place for only one d rection of propagation and the wave will be substantia ly unaffected by the presence of vane 81 for the opposi direction of propagation. Core 83 and solenoid 84 re resent means for subjecting vane 81 to a biasing magnet field that may be tapered in accordance with the teacl ings of the preceding embodiments to obtain a band pas band rejection, low pass or high pass characteristic f the one direction of propagation. By reversing the sen of the field, the direction of propagation for which tl filter characteristic is introduced will be reversed.

In all cases it is understood that the above-describe arrangements are illustrative of a small number of tl many possible specific embodiments which can represe applications of the principles of the invention. Numero and varied other arrangements can readily be devised accordance with these principles by those skilled in tl art without departing from the spirit and scope of the i vention.

What is claimed is:

In combination, a conductively bounded electro-ma netic wave transmission path having an input and an ou put end and a cutoff frequency $f_o$, a source of wa energy including a band of frequencies extending betwe a lower frequency $f_1$ higher than $f_o$ and a frequency higher than $f_1$ and including a frequency $f_2$ between and $f_3$ connected to said input end, filtering means d posed within said path comprising an element of magn ically polarizable material capable of exhibiting gyr magnetic effects over said band of frequencies and ha ing a sharp gyromagnetic resonance characteristic wi respect to said band, said element having a uniform tra verse cross section that extends longitudinally along sa path, means for inducing gyromagnetic resonance said element over a preselected range of frequencies e tending from $f_1$ to $f_2$ comprising a pair of magne pole pieces uniformly spaced to receive a portion only said element, said pole pieces extending longitudina beyond one end of said element to produce at said end maximum field intensity in said element that induc gyromagnetic resonance at said one end at frequency the remainder of said element extending longitudinally b yond said pole pieces at the other end thereof to produ at said other end a minimum field intensity in said e ment that induces gyromagnetic resonance at said otl end at a frequency no greater than $f_o$, and means utilizing said applied wave energy between the frequenc $f_2$ and $f_3$ to the exclusion of said frequencies within s preselected range of frequencies between $f_1$ and $f_2$ c nected to said output end.

(References on following page)

References Cited in the file of this patent

UNITED STATES PATENTS

| | | |
|---|---|---|
| 2,532,157 | Evans | Nov. 28, 1950 |
| 2,555,131 | Hershberger | May 29, 1951 |
| 2,700,147 | Tucker | Jan. 18, 1955 |
| 2,743,322 | Pierce et al. | Apr. 24, 1956 |
| 2,745,069 | Hewitt | May 8, 1956 |
| 2,762,871 | Dicke | Sept. 11, 1956 |
| 2,802,184 | Fox | Aug. 6, 1957 |
| 2,806,972 | Sensiper | Sept. 17, 1957 |

FOREIGN PATENTS

| | | |
|---|---|---|
| 721,309 | Great Britain | Jan. 5, 1955 |

OTHER REFERENCES

Kales et al.: Journal of Applied Physics, vol. 24, No. 6, June 1953, pages 816–817.

Darrow: Bell System Technical Journal, vol. 32, Nos. 1 and 2, January and March 1953, pages 74–99 and 384–405.

Spectroscopy at Radio and Microwave Frequencies (D. J. E. Ingram), published by Butterworths Scientific Publications (London), 1955 (pages 205 and 215 relied on).